United States Patent
Yang et al.

(10) Patent No.: US 7,961,972 B2
(45) Date of Patent: Jun. 14, 2011

(54) METHOD AND APPARATUS FOR SHORT RANGE MOTION ADAPTIVE NOISE REDUCTION

(75) Inventors: Shengqi Yang, Chandler, AZ (US); Tiehan Lu, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1071 days.

(21) Appl. No.: 11/799,510

(22) Filed: May 1, 2007

(65) Prior Publication Data

US 2008/0273119 A1    Nov. 6, 2008

(51) Int. Cl.
*G06K 9/40* (2006.01)
(52) U.S. Cl. .................. 382/261; 345/601; 345/602
(58) Field of Classification Search .......... 345/601, 345/602; 382/261; 396/236; 708/235; 714/759
See application file for complete search history.

(56) References Cited

U.S. PATENT DOCUMENTS

| | | | |
|---|---|---|---|
| 4,941,190 A * | 7/1990 | Joyce | 382/264 |
| 6,633,683 B1 * | 10/2003 | Dinh et al. | 382/260 |
| 2006/0215058 A1 | 9/2006 | Lu et al. | 248/452 |

OTHER PUBLICATIONS

C. Tomasi and R. Manduchi, "Bilateral Filtering for Gray and Color Images," 1998, pp. 1-8.
U.S. Appl. No. 11/648,259, filed Dec. 29, 2006, entitled "Adaptive Video De-Interlacing," by Tiehan Lu.

* cited by examiner

*Primary Examiner* — Gregory F Cunningham
(74) *Attorney, Agent, or Firm* — Trop, Pruner & Hu, P.C.

(57) ABSTRACT

In one embodiment, the present invention includes a method for generating and storing in a lookup table a first array of next field values for use in generation of weighted pixel values and generating and storing a second array in the lookup table of previous field values for use in generation of the weighted pixel values, determining if motion is present in a pixel of a field under analysis, if the motion is present, performing spatial de-noising using a weighted pixel average of a window of a predetermined size, otherwise performing temporal de-noising using a weighted pixel value between the pixel and a previous pixel using information in the lookup table. Other embodiments are described and claimed.

17 Claims, 2 Drawing Sheets

METHOD AND APPARATUS FOR SHORT RANGE MOTION ADAPTIVE NOISE REDUCTION

BACKGROUND

In video processing, incoming video data is processed to prepare the data for output on a display such as an associated display of a computer system. Depending on the type and quality of the incoming data, compression or other encoding applied to the data, various filtering may be performed to improve image quality.

For example, filtering may be performed to reduce noise inherent in the video data, such as a video sequence. Existing noise reduction algorithms include spatial de-noising and temporal de-noising, among others. Many existing algorithms are very computation intensive and require significant resources to process the data. Furthermore, certain noise such as Gaussian noise in large motion images and small motion images, as well as so-called mosquito noise/ringing and blockiness that originates from an inner property of block coding of video data is generally not effectively reduced in many filters.

DETAILED DESCRIPTION

In various embodiments, a motion adaptive noise reduction filter may be implemented to perform noise reduction to improve the visual effect of a video sequence during video processing. This filter may perform both spatial de-noising and temporal de-noising. More specifically, for each pixel under analysis temporal de-noising may be performed if no motion is indicated for the pixel, otherwise spatial de-noising is performed if motion is indicated.

In a video processing pipeline, three continuous images/fields/frames can be obtained by buffering. These are referred to as previous image/field/frame, current image/field/frame and next image/field/frame. Embodiments may take previous field/frame, next field/frame and motion information as inputs. The motion information can come from any motion estimation module. In one embodiment, motion estimated in a short range, say a 5 by 3 window, may be detected. For each pixel in the next field under processing, temporal noise reduction is used if there is no motion indicated by the corresponding value stored in the motion image; otherwise, spatial noise reduction is used. Furthermore, embodiments can process interlaced video and non-interlaced video. For interlaced video, it takes fields as inputs, otherwise, it takes frames as inputs.

Figure 1:
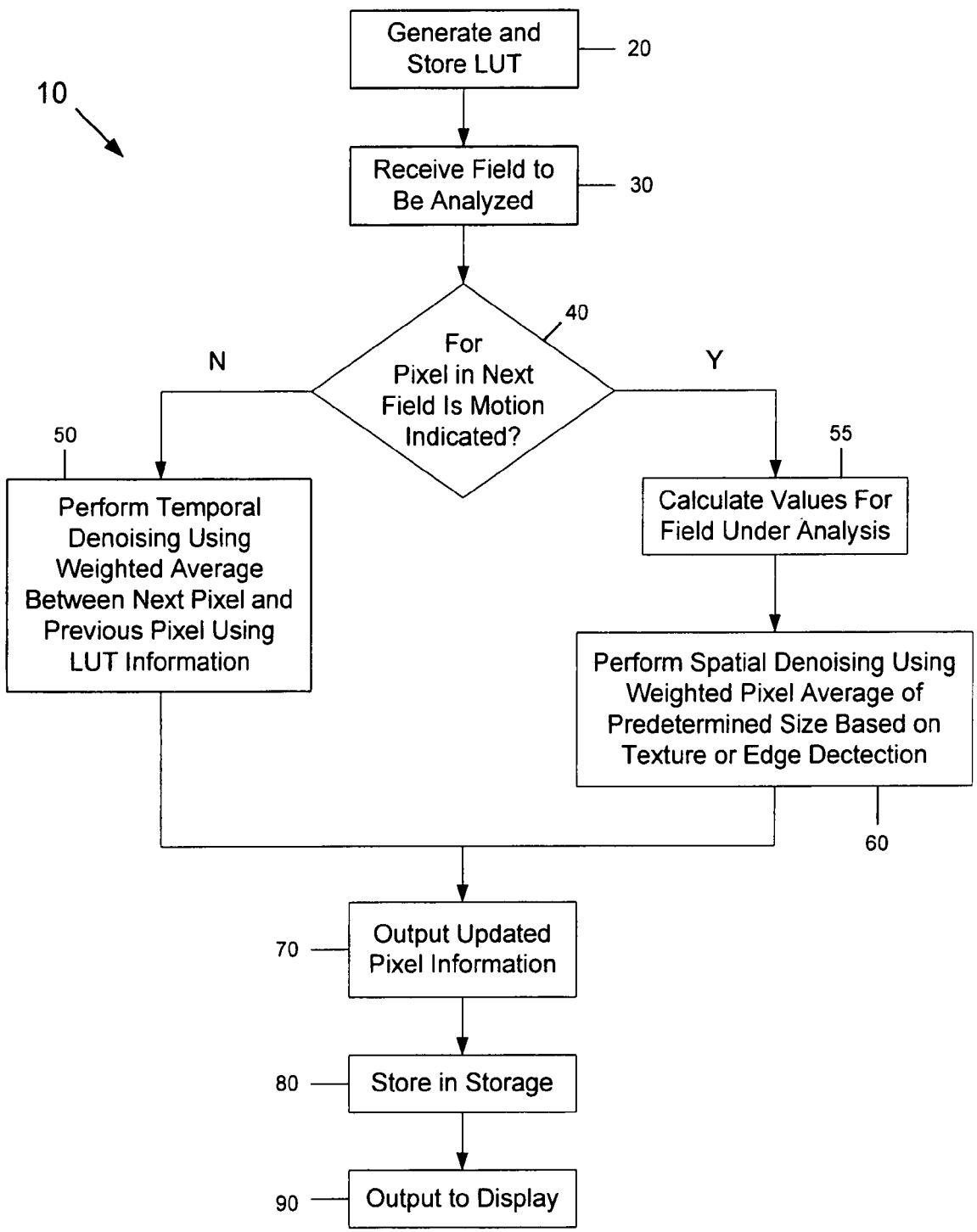
FIG. 1 is a flow diagram of a method in accordance with one embodiment of the present invention.

Referring now to FIG. 1, shown is a flow diagram of a method in accordance with one embodiment of the present invention. As shown in FIG. 1, method 10 may be used to perform noise reduction in accordance with an embodiment of the present invention. As shown in FIG. 1, method 10 may begin by generating and storing a lookup table (LUT) based on a first algorithm. More specifically, multiple lookup tables may be created to store values that are used to generate weighted averages for pixels under analysis. More specifically, a first lookup table may store weighted values for pixels of a next field/frame while a second lookup table may store weighted values for pixels of a previous field/frame. Note that these lookup tables may remain unchanged for different videos and thus may be generated upon system initialization and stored in a memory accessible during video processing. Shown in Table 1 below is pseudo code of an exemplary method for generation of LUTs in accordance with an embodiment of the present invention.

TABLE 1

```
For (i=0; i<=16; i++)
{
    temp_value = (i*i)>>2;
    a_value[i] = 64-temp_value;
    d_value[i] = 64+temp_value;
}
```

From the above code, the addition of d_value and a_value is 128 which is a power of 2. This property greatly simplifies the operation of weighted averaging by substituting division by shifting as discussed below.

Still referring to FIG. 1, a field may be received that is to be analyzed (block 30). For example, a field may be received with pixel information, e.g., with Luminance/Chrominance (YUV) or YCrCb values. While described in the context of FIG. 1 as a field, note that embodiments may be used in connection with images, fields and/or frames based on a particular implementation.

Control passes to diamond 40, where it may be determined for a given pixel under analysis in the next field whether motion is indicated (diamond 40). If not, control passes to block 50 where temporal de-noising may be performed.

In one embodiment, temporal noise reduction may use a weighted average between the next pixel and the previous pixel based on information in the LUT. Specifically, as shown in Table 2 below, which is pseudo code for a temporal de-noising algorithm in accordance with an embodiment of the present invention, the weighting for each pixel depends on how large the difference is between the next pixel and the previous pixel. A larger difference means more weight is given to the next pixel and less weight is given to the previous pixel (and vice versa). This mechanism thus ensures that the pixel value is not changed too aggressively, which can lead to frame flickering. Note that while shown in the pseudo code of Table 2 as generating weighted averages for Y components, other embodiments may generate weighted averages for U or V components.

TABLE 2

```
LUT_index = abs(NextY - PrevY)>>TWShift;
if (LUT_index>=16) LUT_index = 16;
Weight_next = d_value[LUT_index];
Weight_Prev = a_value[LUT_index];
dstY = (Weight_next * NextY + Weight_prev * PrevY + residual)>>7;
```

Thus weighted averages may be calculated between the next pixel and the previous pixel using information in the LUT and used to generate and updated Y pixel value. In Table 2, NextY and PrevY represent the Y component of the pixel in the next field/frame and Y component of the pixel in the previous field/frame, TWShift is a parameter used to adjust the strength of temporal noise reduction. In a video sequence, if most of the image is static, more strength may be placed on the temporal noise reduction, i.e., making the TWShift bigger. The value of TWShift ranges from 0 to 2, in one embodiment. By adding this TWShift parameter, the strength of temporal noise reduction can be adjusted, and can make the static part of an image very clean. In order to determine whether most part (say 60%) of an image is static, statistics of a whole image may be performed to determine how many pixels are moving. This information once again comes from a motion estimation module. Residual is a parameter used to compensate the precision loss caused by the 7-bit right shift. It can be 64 in accordance with an embodiment of the present invention.

Control then passes to block 70, where this updated pixel information may be output, and may be stored in an appropriate storage (block 80), for example, a frame buffer or other location. Then the stored information may be output to a display (block 90), e.g., a digital display such as a flat panel display or other such display.

Referring still to FIG. 1, if instead at diamond 40 it is determined that motion is indicated for a given pixel, control passes to block 55 for calculation of various values to be used in spatial de-noising. For example, a new field/frame may be created by averaging U and V components. Also, variance and average values may be calculated for the Y component within a small window. Furthermore, an average value for each pixel in the new UV field/frame within a small window may also be calculated. Next, control passes to block 60 where spatial de-noising may be performed using a weighted pixel average of a predetermined size. More specifically, based on whether a texture or edge is detected, a weighted pixel average may be determined based on a different size window. Thus first texture/edge detection is performed based on how many pixels around a given pixel have high variance values. This detection process can be carried out by only using the Y component information in accordance with an embodiment of the present invention. When the number of such pixels is greater than a given threshold, it is determined that the pixel under analysis is part of a texture or strong border. Then spatial averaging may be carried out simultaneously for Y, U and V components of the pixel under analysis with different averaging radii. For flat areas with large details (i.e., a non-texture or edge pixel), a large radius may be used, while for textures, small details and edges, a smaller averaging radius may be used. Furthermore, for texture areas, an edge detection analysis may be performed. If a strong horizontal or vertical edge is detected, the spatial noise reduction may be performed along that horizontal or vertical direction, respectively. While the scope of the present invention is not limited in this regard, in various embodiments, the weighting attributed to different pixels within an average window may be calculated in accordance with Equation 1. Thus using Equation 1, a weight of a pixel in the predefined local window is larger when variance and average values in its position are closer to the variance and the average values of the central pixel.

$$\text{Weight} = \frac{curWeight}{\left[1 + \frac{|LocalVariance - CentralVariance|}{spatDiv}\right] \left[1 + \frac{|LocalAverage - CentralAverage|}{SpatDiv}\right]} \quad [\text{EQ. 1}]$$

where curWeight is a normalization value and SpatDiv is a weighting parameter. For calculating the weighted average for the Y component of a pixel, LocalVariance and LocalAverage means the variance and the average values for the Y component of the pixel in the predefined window where the pixel under analysis is in the center, while CentralVariance and CentralAverage are the variance and the average values for the Y component of the pixel under analysis. For calculating the weighted average for the U or V component of a pixel, LocalVariance and CentralVariance have the same meaning as those used for the Y component, while LocalAverage and CentralAverage are the average values for the surrounding pixel and the central pixel in the predefined window in the UV field/plane. Variance and average values are not calculated for U component or V component in order to reduce the computation complexity, in some embodiments. Instead, variance for the Y component and average for UV components in the UV field/frame are used for the weighted average calculation for U and V components.

Table 3 below shows pseudo code for the adaptive filtering in accordance with an embodiment of the present invention.

TABLE 3

```
Initialization
    Create an UV image/field/frame
    Calculate variance and average values for each Y
components within a small window
    Calculate average for each component in the UV
image/field/frame within a small window
    For each pixel in the next field
    {
        If (motion is not indicated for this pixel)
        {
            //Temporal Denoising
            Obtain absolute difference (AD) between next
            pixel and previous pixel
            Do table look-up to generate the weights
            Weighted average of next pixel and previous pixel
            Output the weighted average as the clean pixel
        }
        Else
        {
            //Spatial Denoising
            Accumulate the Y variance in a predefined window
            (for example, 5×5)
            If (the accumulation is greater than a texture threshold)
            {
                Detect horizontal line within a short range
                Detect vertical line within a short range
                If (vertical line is found)
                {
                    Weighted average along vertical direction
                }
                Else if (horizontal line is found)
                {
                    Weighted average along horizontal direction
                }
                Else
                {
                    Weighted average within a 3 by 3 window
                }
                End if
            }
            Else
            {
                Weighted average within a 5 by 5 window
            }
            End if
        }
        End if
    }
    End For
```

Note that in some implementations if an edge is found (i.e., a vertical or horizontal) line, a weighted average may be calculated in one dimension using three pixels. In contrast, for a textured pixel, the weighted average may be performed using a three-by-three window while for a flat area (i.e., a non-texture) a five-by-five window may be used.

Figure 2:
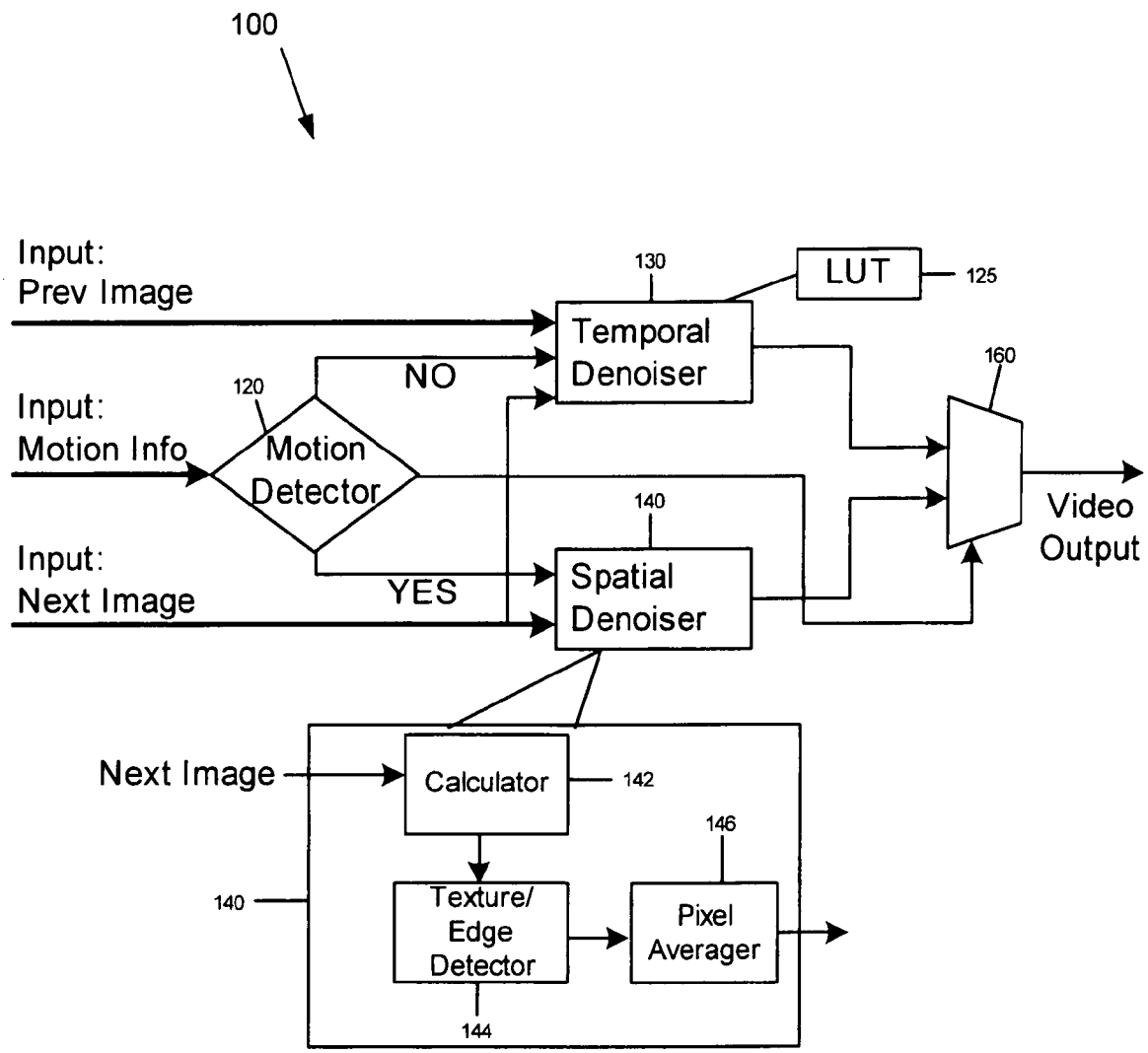
FIG. 2 is a block diagram of a filter in accordance with an embodiment of the present invention.

Referring now to FIG. 2, shown is a block diagram of a filter in accordance with an embodiment of the present invention. As shown in FIG. 2, filter 100, which may be part of a video processor, general-purpose processor or other graphics processing engine includes a motion decision maker 120. In various embodiments, motion decision maker 120 may receive input motion information from a short range motion estimator (SRME). Based on whether motion is indicated or not for a given pixel under interest, either a temporal de-noising block 130 may execute or a spatial de-noising block 140 may execute. Note that spatial de-noising block 140 includes a calculator 142 to calculate Y variance and average values and to create a new UV image/field/frame and to generate the average value for each component in this new UV plane. These values may be provided to a texture/edge detection block 144 to determine whether a texture and/or edge exist. Based on that determination, values may be provided to a pixel averaging block 146 to perform pixel averaging of a given window size based on the texture/edge detection decision. From both temporal de-noising block 130 and spatial de-noising block 140, pixel outputs may be provided to a multiplexer 160, which is controlled by a signal from motion decision maker, 120 to thus provide a video output corresponding to an updated pixel value for the pixel under analysis.

In turn, a lookup table 125 may be coupled to temporal de-noising block 130 to store values for use in generating weights on pixels in the next and previous fields. In one embodiment, two such LUTs may be present, one for the previous field and one for the next field. Thus, embodiments can clean Gaussian noise for both large motion images and small motion images. Furthermore, embodiments can significantly reduce mosquito noise/ringing and blockiness which is originated from the inner property block coding algorithms.

Embodiments may be implemented in an algorithm that can be executed in many different system types. For example, such systems can include digital imaging devices such as digital cameras, digital televisions, digital video devices and so forth. Similarly, embodiments may be implemented in computer systems such as server computers, personal computers, mobile devices such as cellular telephones and so forth. In such processor-based systems, an algorithm in accordance with an embodiment may be performed in a general-purpose processor such as a microprocessor, a graphics processing unit (GPU) or other such processing unit adapted with the filter of FIG. 2.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   generating and storing, using a processor, in a lookup table a first array of next field values for use in generation of weighted pixel values and generating and storing a second array in the lookup table of previous field values for use in generation of the weighted pixel values;
   determining, using the processor, if motion is present in a pixel of a field under analysis;
   if the motion is present, performing, using the processor, spatial de-noising using a weighted pixel average of a window of a predetermined size, wherein the predetermined size is based on whether a texture or edge is detected for the pixel under analysis;
   performing, using the processor, temporal de-noising if the motion is not detected using a weighted pixel value between the pixel and a previous pixel using information in the lookup table; and
   outputting, using the processor, updated pixel information from the spatial de-noising or the temporal de-noising and storing the updated pixel information in a storage.

2. The method of claim 1, further comprising calculating a variance value and an average value for a first component of the pixel under analysis.

3. The method of claim 2, further comprising calculating an average value for a second and third component of the pixel.

4. The method of claim 1, further comprising performing the weighted pixel average in a single dimension if an edge is detected, wherein the predetermined size corresponds to a first size.

5. The method of claim 4, further comprising performing the weighted pixel average in a two-dimensional window of a second size if a texture is detected, wherein the second size is greater than the first size.

6. The method of claim 5, further comprising performing the weighted pixel average in a two-dimensional window of a third size, wherein the third size is greater than the second size if no texture is detected.

7. The method of claim 1, further comprising obtaining the weighted pixel value by performing a multiplication of the pixel by a weighted value from the first array and multiplying the previous pixel by a weighted value from the second array and adding a residual value and then performing a right shift operation.

8. The method of claim 7, further comprising obtaining the weighted pixel average of the window of the predetermined size of a plurality of pixels, wherein each pixel is calculated according to:

$$\text{Weight} = \frac{curWeight}{\left[1 + \frac{|LocalVariance - CentralVariance|}{spatDiv}\right]\left[1 + \frac{|LocalAverage - CentralAverage|}{SpatDiv}\right]}$$

where curWeight is a normalization value, LocalVariance and LocalAverage are variance and average values for the pixel neighboring to the pixel under analysis in the window and CentralVariance and CentralAverage are variance and average values for a central pixel of the window and SpatDiv is a weighting parameter.

9. An apparatus comprising:
   a processor to generate and store a first array of next field values for use in generation of weighted pixel values and generate and store a second array of previous field values for use in generation of the weighted pixel values, determine if motion is present in a pixel of a field under analysis, if the motion is present, perform spatial de-noising using a weighted pixel average of a window of a predetermined size, wherein the predetermined size is based on whether a texture or edge is detected for the pixel under analysis, perform temporal de-noising if the motion is not detected using a weighted pixel value between the pixel and a previous pixel using information in the first and second arrays, and output updated pixel information from the spatial de-noising or the temporal de-noising and store the updated pixel information in a storage.

10. The apparatus of claim 9, wherein the processor comprises a filter including:
   a temporal denoiser;
   a lookup table coupled to the temporal denoiser; and
   a spatial denoiser.

11. The apparatus of claim 10, further comprising a selector coupled to the temporal denoiser and the spatial denoiser to cause the temporal denoiser or the spatial denoiser to operate on pixel data based on whether motion is detected with regard to the pixel data.

12. The apparatus of claim 11, wherein the spatial denoiser includes:
   a variance calculator and an averager;
   a texture and edge detector coupled to an output of the variance calculator and the averager; and
   a pixel averager to perform a pixel average on a predetermined window size based on an output of the texture and edge detector.

13. The apparatus of claim 12, further comprising a multiplexer to receive outputs of the temporal denoiser and the spatial denoiser, the multiplexer controlled by a signal from the selector.

14. The apparatus of claim 13, wherein the apparatus comprises a video processor.

15. A non-transitory article comprising a processor readable storage medium including instructions that when executed enable a system to:
   generate and store in a lookup table a first array of next field values for use in generation of weighted pixel values and generate and store a second array in the lookup table of previous field values for use in generation of the weighted pixel values;
   determine if motion is present in a pixel of a field under analysis;
   if the motion is present, perform spatial de-noising using a weighted pixel average of a window of a predetermined size, wherein the predetermined size is based on whether a texture or edge is detected for the pixel under analysis;
   perform temporal de-noising if the motion is not detected using a weighted pixel value between the pixel and a previous pixel using information in the lookup table; and
   output updated pixel information from the spatial de-noising or the temporal de-noising and store the updated pixel information in a storage.

16. The article of claim 15, wherein the instructions enable the system to calculate a variance value and an average value for a first component of the pixel under analysis.

17. The article of claim 16, wherein the instructions enable the system to calculate an average value for a second and third component of the pixel.

* * * * *